Aug. 31, 1926.
H. D. JAMES ET AL
1,597,896
ELEVATOR CONTROL SYSTEM
Filed April 26, 1923
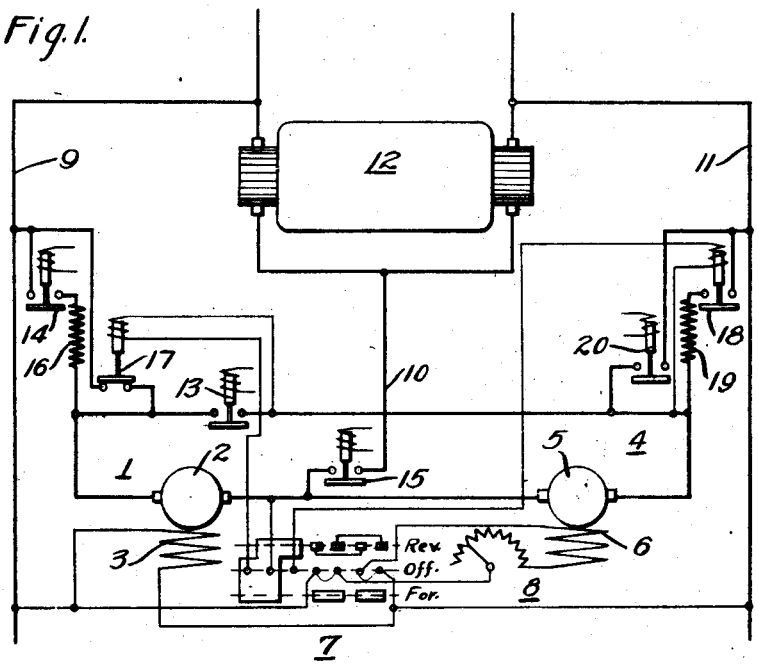
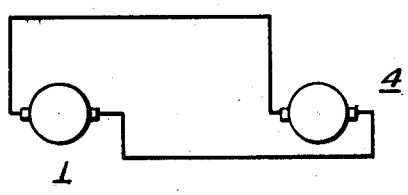
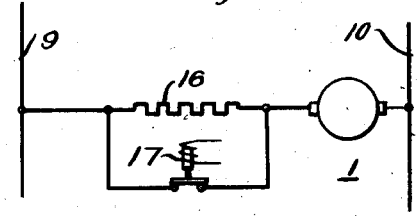
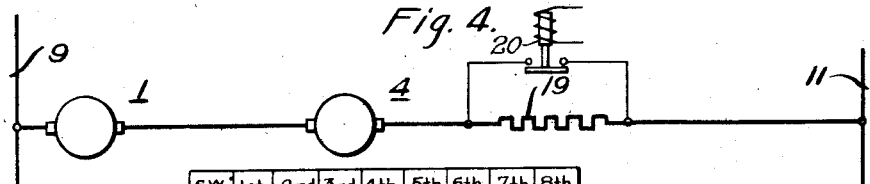
| SW | 1st | 2nd | 3rd | 4th | 5th | 6th | 7th | 8th |
|---|---|---|---|---|---|---|---|---|
| 7 | FORWARD | | | | REVERSE | | | |
| 13 | O | O | | | | | | |
| 14 | | O | O | O | O | O | O | O |
| 15 | | O | O | O | O | | | |
| 17 | | | | O | | | | O |
| 18 | | | | | O | O | O | O |
| 20 | | | | | | | O | O |
WITNESSES:
A. L. Jeffrey
H. Keith
INVENTORS
Henry D. James &
Rudolf E. Hellmund.
BY
Wesley G. Carr
ATTORNEY Patented Aug. 31, 1926.

1,597,896

UNITED STATES PATENT OFFICE.

HENRY D. JAMES, OF EDGEWOOD PARK, AND RUDOLF E. HELLMUND, OF PITTSBURGH, PENNSYLVANIA, ASSIGNORS TO WESTINGHOUSE ELECTRIC AND MANUFACTURING COMPANY, A CORPORATION OF PENNSYLVANIA.

ELEVATOR-CONTROL SYSTEM.

Application filed April 26, 1923. Serial No. 634,736.

Our invention relates to systems of control and it has particular relation to such systems as are employed in connection with elevators, hoists and similar machines.

The object of our invention is to provide a more efficient and flexible system of motor control than is afforded by the familiar rheostatic devices.

According to our invention, we propose to employ an auxiliary low-voltage generator in connection with a three-wire system of distribution, whereby the hoisting motor is initially controlled by the low-voltage generator, the voltage of which is variable. When the motor has been accelerated to a suitable degree, it is transferred to the low-voltage conductors of the source of supply and the generator is disconnected from the circuit with the motor armature. To further increase the motor speed, the generator is re-connected in reversed polarity with the motor, and both machines are connected to the high-voltage line conductors. The generator voltage is regulated to further increase the motor speed and, finally, the motor is connected directly to the high-voltage line conductors.

Our invention will be best understood by reference to the accompanying drawing in which, Figure 1 is a diagrammatic view of circuits and apparatus embodying our invention.

Figs. 2, 3 and 4 illustrate the main-circuit connections, according to our invention, for different operating speeds of the motor.

Fig. 5 is a chart indicating the sequence of operation of the various switches to accelerate the motor.

With reference to the drawing, a motor 1 having an armature 2 and a field-magnet winding 3 is arranged for connection in circuit with an auxiliary generator 4 having an armature 5 and a field-magnet winding 6. The generator 4 is driven at constant speed in any familiar manner. A reversing switch 7 and a rheostat 8 are provided for the auxiliary generator 4. A three-wire system of distribution comprises conductors 9, 10 and 11, a double-commutator machine 12 or any other suitable source of energy being provided for energizing supply conductors 9, 10 and 11. The various control switches and rheostat 8 may be operated by any suitable master switch (not shown) such as is commonly employed. Fig. 5 indicates the various steps of operation that are hereinafter described.

Assuming the apparatus in its inoperative position as illustrated in Fig. 1, the motor 1 is started by connecting the armature 2 in circuit with armature 5 of generator 4 upon the operation of reversing switch 7 to its forward operating position and the closure of a manually controlled switch 13. The generator field winding 6 is now connected to line conductors 9 and 11, rheostat 8 having its entire resistor active. Motor field winding 3 is also energized from conductors 9 and 11. The generator 4 supplies motor 1 with current at a minimum voltage and as rheostat 8 is gradually cut out, the voltage is increased to a maximum which may be assumed to be less than the voltage between line conductors 9 and 10. Armature 2 is next connected to line conductors 9 and 10 through switches 14 and 15 (which are manually controlled) and through a protective resistor 16. A switch 17, controlled in accordance with the voltage of generator armature 5, is open while said voltage is above a desired minimum value and bridges switch 14 and resistor 16 at or below said minimum voltage. Switch 13 is next opened whereby armature 2 is disconnected from the generator armature 5 and the motor armature 2 receives its energy directly from conductors 9 and 10.

Reversing switch 7 is now returned to its initial position and, when the voltage of generator 4 reaches a predetermined low value, resistor 16 is shunted by switch 17, whereupon motor 1 is accelerated in accordance with the voltage of conductors 9 and 10.

The motor 1 is further accelerated by connection thereof to line conductors 9 and 11 with its armature 2 in series relation with armature 5 of generator 4. To establish this connection, the reversing switch 7 is actuated to its reverse operating position. When the generator field winding 6 is fully excited, the booster 4 is connected in circuit upon the closure of a switch 18, which is controlled in accordance with the voltage of generator armature 5. Switch 15 is now opened and the armature 2 receives current from conductors 9 and 11 through the generator armature 5 and a protective resistor 19. Resistor 19 is next shunted by means of a switch 20 and the speed of motor 1 is gradually increased by returning rheostat 8 to its initial position, thereby decreasing the field strength of the generator 4. At full field strength, the generator armature 5 absorbs substantially one-half of the voltage between line conductors 9 and 11, the motor 1 also absorbing one-half. As the generator field is weakened, the voltage drop across the armature 5 decreases and, therefore, the voltage impressed upon the motor armature 2 is correspondingly increased. When the generator field is reduced to zero, the motor 1 is supplied with maximum voltage, and is thus accelerated to full speed.

The motor speed may be still further increased by again reversing the excitation of the generator winding 6 and increasing the excitation to maximum, but the foregoing arrangement is deemed preferable.

In Fig. 2, we have illustrated the initial operating condition in which the motor 1 is supplied entirely with energy from the auxiliary generator 4.

In Fig. 3, we have illustrated the second running condition in which the motor 1 is connected to line conductors 9 and 10 and is operating at a speed greater than when connected as in Fig. 2.

In Fig. 4 the full speed connection is illustrated in which the motor 1 and generator 4 are connected to line conductors 9 and 11. The various steps in connection with Figs. 2, 3 and 4 have been described above with reference to Fig. 1.

It is obvious that the motor may be decelerated in a step-by-step manner, the reverse of that outlined above. In other words, the motor passes through the various steps from the connections of Fig. 4 to those of Fig. 3 and finally to Fig. 2, prior to stopping.

From the foregoing description it should be apparent that a large number of operating speeds may be obtained with a minimum amount of wasted energy, because, according to our system, it becomes unnecessary to employ rheostatic control beyond the momentary insertion of protective resistors employed when switching from one set of line conductors to another.

Various modifications of our system may readily be made and the steps may be controlled in a manner readily understood by the use of time element relays or other automatic devices. We desire, therefore, to be limited only in accordance with the appended claims.

We claim as our invention:

1. The combination with a motor and a source of energy comprising a normal and a low constant-voltage circuit, of a variable voltage generator, means for connecting said motor in circuit, selectively, with said generator and with either of said constant-voltage circuits, without interruption of the motor circuit, and means responsive to the generator voltage for controlling the motor.

2. The combination with a motor and a source of energy comprising a normal and a low constant-voltage circuit, of a variable voltage generator and means for connecting said motor in circuit, progressively, with said generator and with said sources of constant voltage, without interruption of the motor circuit, and means responsive to the generator voltage for controlling the motor connections.

3. The combination with a motor and a source of energy comprising a normal and a low constant-voltage circuit, of a variable voltage generator, means for connecting said motor in circuit, simultaneously, with said generator and with one of said sources of constant voltage, and means responsive to the generator voltage for controlling the voltage impressed on said motor, while so connected.

4. The combination with a motor and a source of energy comprising a normal and a low constant-voltage circuit, of a variable voltage generator, means for connecting said motor in circuit, selectively, with said generator and with either of said constant-voltage circuits, and means controlled by the generator voltage for limiting the current supplied to said motor.

5. The combination with a motor and a source of energy comprising a normal and a low constant-voltage circuit, of a variable voltage generator and means for connecting said motor in circuit, selectively, with said generator and with either of said constant-voltage circuits, means for varying the voltage of said generator, and means responsive to the generator voltage for controlling the motor connections.

In testimony whereof, we have hereunto subscribed our names this 23rd day of April, 1923.

HENRY D. JAMES.
RUDOLF E. HELLMUND.